C. GIBBON.
COTTON CULTIVATOR.

No. 67,289. Patented July 30, 1867.

Witnesses:

Inventor:

United States Patent Office.

CHARLES GIBBON, OF HICKSFORD, VIRGINIA.

Letters Patent No. 67,289, dated July 30, 1867.

---

IMPROVEMENT IN COTTON-CULTIVATOR.

---

*The Schedule referred to in these Letters Patent and making part of the same.*

---

TO ALL WHOM IT MAY CONCERN:

Be it known that I, CHARLES GIBBON, of Hicksford, Greenville county, Virginia, have invented a new and improved Cotton-Cultivator; and I do hereby declare that the following is a full, clear, and exact description thereof, which will enable others skilled in the art to make and use the same, reference being had to the accompanying drawings, forming part of this specification.

This invention relates to a new and improved machine for cultivating cotton, scraping the earth from the plants, thinning out the same, and throwing up fresh, loose earth thereto. In the accompanying sheet of drawings—

Figure 1:
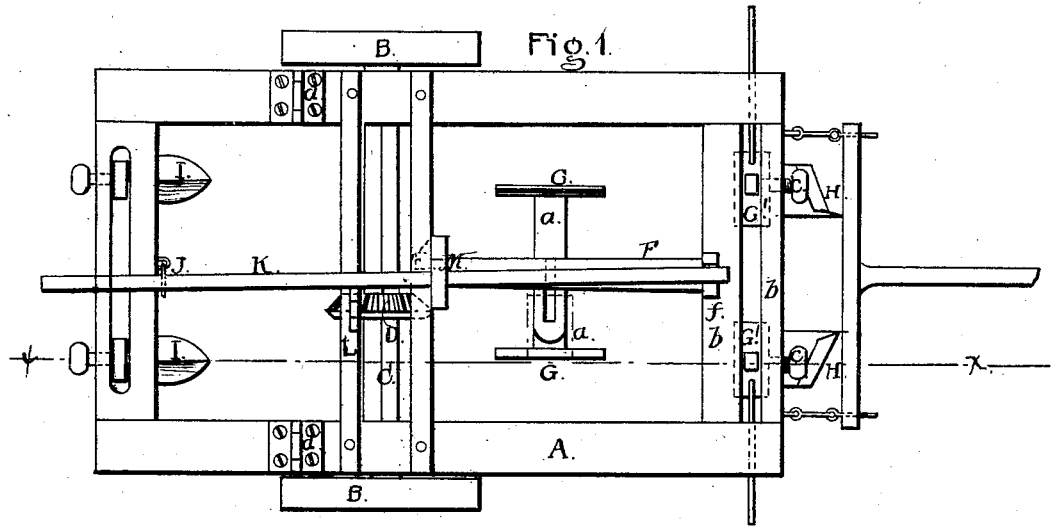

Figure 1 is a plan or top view of my invention.

Figure 2:
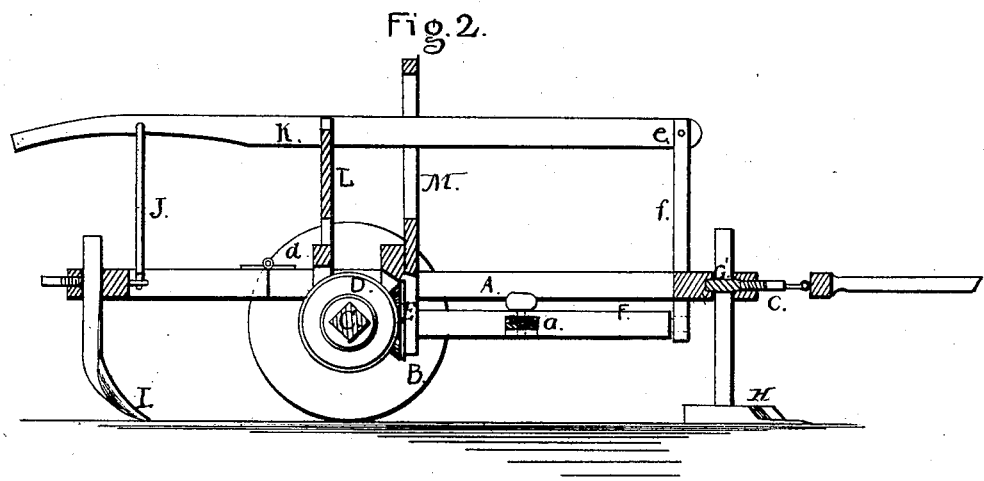

Figure 2, a side sectional view of the same taken in the line $x\ x$, fig. 1.

Similar letters of reference indicate corresponding parts.

A represents a rectangular frame mounted on two wheels, B B, which are secured or permanently attached to a revolving axle, C, on which there is keyed a bevel-wheel, D, the latter gearing into a corresponding wheel, E, on a longitudinal shaft, F, in the frame A. On this shaft F there are secured adjustable arms $a$, to the ends of which cutters G are attached to thin out the plants, the cutters being made to revolve as the machine is drawn along, and made to cut at a greater or less distance from the shaft F, by adjusting further inward or outward the arms $a$. The front part of the frame A has two cross-bars, $b\ b$, grooved at their inner sides, or the sides which face each other, to receive slides G' in which the standards of scraper-ploughs H are fitted. These ploughs may be adjusted nearer to or farther from each other, as desired, by moving the slides G', and they are secured in position by set-screws $c$ which pass through the front cross-bar $b$ and bear against the standards of the ploughs. The rear part of the frame A, or the position just back of the axle C, is divided from the front part and connected to it by hinges $d\ d$, which admit of said rear part being raised or elevated when desired, so that ploughs I I which are attached to it may be raised out of the ground when necessary. These ploughs I I may be attached to the rear part of the frame A in the same way as those at the front end, and the rear part of the frame is connected by a rod or link, J, to a lever, K, the front end of which is connected by a fulcrum-pin, $e$, to an upright, $f$, on frame A. The rear end of the shaft F has its bearing in the lower end of a pivoted bar, M, on the frame A, the lever K passing through an oblong slot in said pivoted bar.

From the above description it will be seen that as the device is drawn along the scraper-ploughs H H will scrape or loosen the earth at each side of the row, the horses or draught animals walking one at each side of the same, and the rotary cutters G G thin out the plants, while the rear ploughs I I throw fresh, loose earth up to the plants. In turning the device at the ends of rows, the rear ploughs I I are raised above or out of the ground, in order to avoid injury to crops, by raising the lever K and resting it upon upright L, and by pressing down the rear end of said lever the scraper-ploughs may be raised free from the ground. In raising the lever K for this purpose, it is moved laterally at the same time, and the wheel E on shaft F thrown out of gear with the wheel D, so that the rotation of the cutters G will be stopped as the machine is turned.

Having thus described my invention, what I claim as new, and desire to secure by Letters Patent, is—

1. The combination of the front and rear ploughs H H I I with the hinged main frame A and lever K, substantially as and for the purpose specified.

2. I also claim the rotary cutters G G, in combination with the scraper-ploughs H H and the rear ploughs I I, all arranged substantially in the manner as and for the purpose set forth.

3. I further claim the pivoted bar M on the frame A, in combination with the rotary cutter-shaft F and the lever K, all arranged substantially as and for the purpose specified.

CHARLES GIBBON.

Witnesses:
R. E. DAVIS.
E. P. LAND.